United States Patent
Carter et al.

(10) Patent No.: US 8,959,297 B2
(45) Date of Patent: Feb. 17, 2015

(54) RETRIEVING A USER DATA SET FROM MULTIPLE MEMORIES

(75) Inventors: Joshua Daniel Carter, Lafayette, CO (US); Burkhard Eichberger, Longont, CO (US); Matthew Thomas Starr, Lafayette, CO (US)

(73) Assignee: Spectra Logic Corporation, Boulder, CO (US)

(*) Notice: Subject to any disclaimer, the term of this patent is extended or adjusted under 35 U.S.C. 154(b) by 74 days.

(21) Appl. No.: 13/488,189

(22) Filed: Jun. 4, 2012

(65) Prior Publication Data

US 2013/0326134 A1 Dec. 5, 2013

(51) Int. Cl.
*G06F 12/08* (2006.01)

(52) U.S. Cl.
USPC .............................. 711/157; 711/5

(58) Field of Classification Search
None
See application file for complete search history.

(56) References Cited

U.S. PATENT DOCUMENTS

| | | | |
|---|---|---|---|
| 6,636,778 B2 * | 10/2003 | Basham et al. | 700/214 |
| 6,912,585 B2 * | 6/2005 | Taylor et al. | 709/231 |
| 7,103,731 B2 | 9/2006 | Gibble et al. | |
| 7,143,433 B1 * | 11/2006 | Duan et al. | 725/115 |
| 8,055,839 B2 | 11/2011 | Kishi et al. | |
| 8,140,747 B2 * | 3/2012 | Depta | 711/112 |
| 8,417,871 B1 * | 4/2013 | de la Iglesia | 711/5 |
| 2004/0103292 A1 | 5/2004 | Shirouze | |
| 2006/0294336 A1 | 12/2006 | Gibble et al. | |
| 2011/0238716 A1 | 9/2011 | Amir et al. | |
| 2011/0238905 A1 | 9/2011 | Amir et al. | |
| 2011/0238906 A1 | 9/2011 | Amir et al. | |

* cited by examiner

*Primary Examiner* — Gary Portka
(74) *Attorney, Agent, or Firm* — Kenneth Altshuler

(57) ABSTRACT

An apparatus and associated methodology for a data storage system having a data storage space operably transferring user data via input/output (I/O) commands between the data storage system and another device. The data storage space includes a first memory device operably storing location information for a selected user data set corresponding to one of the I/O commands. The first memory also operably stores a first amount of the selected user data set. The data storage space also includes a second memory device different than the first memory device and operably storing a different second amount of the selected user data set. The data storage system has a controller that interleaves an entirety of the selected user data set from the first and second memory devices during execution of another of the I/O commands.

18 Claims, 10 Drawing Sheets

RETRIEVING A USER DATA SET FROM MULTIPLE MEMORIES

FIELD

The present embodiments relate generally to a storage element array suited for use in a distributed storage system and more particularly but without limitation to storing user data sets in the array.

BACKGROUND

The combination of multiple storage devices into distributed data storage capacity has proliferated in response to market demands for storing enormous amounts of data that can be readily retrieved in a fast, reliable, and efficient manner.

With continued demands for ever increased levels of storage capacity and data transfer throughput performance, there remains an ongoing need for improvements in the manner in which the storage elements in such data storage arrays are operationally managed in order to optimize the capacity and data throughput performance parameters while minimizing storage expense. It is to these and other related improvements that preferred embodiments of the present invention are generally directed.

SUMMARY

Some embodiments of the present invention contemplate a data storage system having a data storage space operably transferring user data via input/output (I/O) commands between the data storage system and another device. The data storage space includes a first memory device operably storing location information for a selected user data set corresponding to one of the I/O commands. The first memory also operably stores a first amount of the selected user data set. The data storage space also includes a second memory device different than the first memory device and operably storing a different second amount of the selected user data set. The data storage system has a controller that interleaves an entirety of the selected user data set from the first and second memory devices during execution of another of the I/O commands.

Some embodiments of the present invention contemplate a method including operating a data storage system containing a data storage space including a first memory device and a second memory device different than the first memory device; in response to a first input/output (I/O) command between the data storage system and another device to transfer a user data set, storing location information for the user data set and a first amount of the user data set to the first memory device, and storing a different second amount of the user data set to the second memory device; and in response to a second I/O command, interleaving an entirety of the previously stored user data set from the first and second memories.

Some embodiments of the present invention contemplate a data storage library having a frame and a shelf system supported by the frame to queue a plurality of magazines. Each of a plurality of tape cartridges is removably supported by one of the plurality of magazines. Each of a plurality of drives is adapted to engage one of the tape cartridges at a time in a data transfer relationship. A transport system selectively moves the tape cartridges between the queue in the shelf and the data transfer relationships in one of the plurality of drives. A data storage space transfers user data via input/output (I/O) commands between the data storage library and another device. The data storage space includes a first memory device operably storing location information for a selected user data set corresponding to one of the I/O commands, the first memory device also operably storing a first amount of the selected user data set. The data storage space also includes a second memory device different than the first memory device and operably storing a different second amount of the selected user data set. A controller subsequently interleaves an entirety of the selected user data set from the first and second memory devices.

DETAILED DESCRIPTION

Initially, it is to be appreciated that this disclosure is by way of example only, not by limitation. The user data set transfer concepts herein are not limited to use or application with any specific system or method for using storage element devices. Thus, although the instrumentalities described herein are for the convenience of explanation, shown and described with respect to exemplary embodiments, it will be appreciated that the principles herein may be applied equally in other types of storage element systems and methods involving the storage and retrieval of data.

Figure 1:
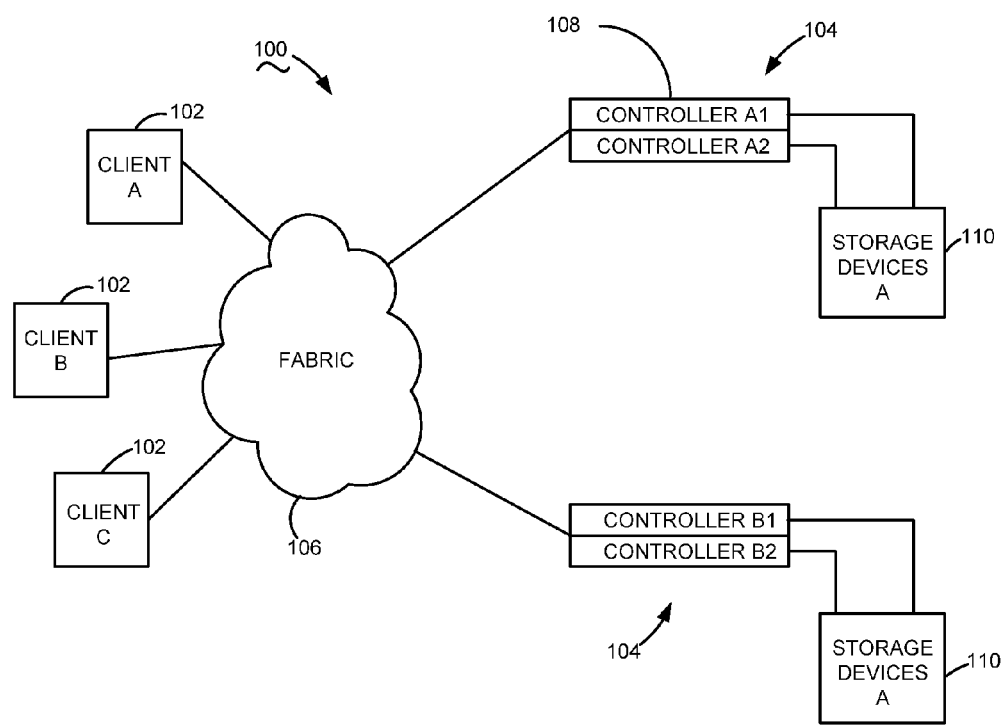
FIG. 1 is a functional block depiction of a distributed storage system utilizing a storage element array that is constructed in accordance with embodiments of the present invention.

To illustrate an exemplary environment in which preferred embodiments of the present invention can be advantageously practiced, FIG. 1 shows a data storage system 100 characterized as providing a storage area network (SAN) utilizing mass storage. The system 100 includes a number of processing client devices 102, respectively identified as clients A, B, and C. The clients 102 can interact with each other as well as with a pair of data storage arrays 104 (denoted A and B, respectively) via a fabric 106. The fabric 106 is preferably characterized as Ethernet, although other configurations can be utilized as well, including the Internet. Data is transferred between the clients 102 and the storage arrays 104 by executing input/output (I/O) commands. Generally, an I/O command can originate from either a client 102 or a storage array 104 to store data to or retrieve previously stored data from a storage array 104.

Each storage array 104 preferably includes a pair of controllers 108 (denoted A1, A2 and B1, B2) for redundancy sake, and a set of data storage devices 110. It is further contemplated that in some embodiments the A client 102 and the A data storage array 104 can be physically located at a first site, the B client 102 and B storage array 104 can be physically located at a second site, and the C client 102 can be yet at a third site, although such is merely illustrative and not limiting.

Figure 2:
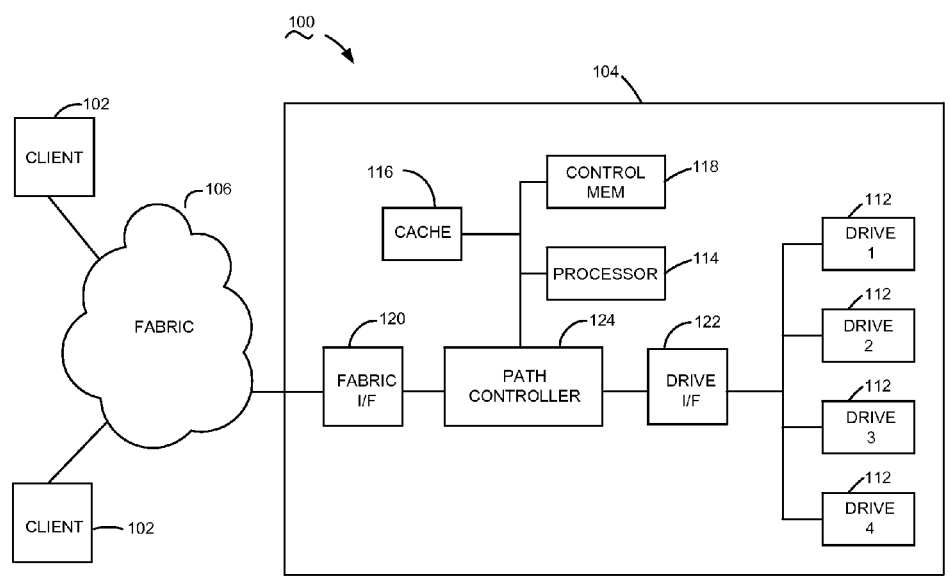
FIG. 2 is a functional block depiction of a portion of the storage element array of FIG. 1.

FIG. 2 diagrammatically depicts illustrative embodiments of the data storage system 100 in which one of the storage arrays 104 is connected to the clients 102 to transfer user data with a number of drives 112 that are individually selectable to transfer the user data by executing the I/O commands via the switchable fabric 106. The drives 112 can be, without limitation, removable media drives such as tape drives used for purposes of the detailed description below. For purposes of this description and meaning of the claimed subject matter the term "user data" means data that is transferred to the storage array 104 and that is retrieved from the storage array 104 as the result of a user of the data storage system 100 interfacing, either directly or indirectly, with one or more of the clients 102. For example, without limitation, the client 102 can be a computational device with a user interface permitting the user to either store information of quantitative or qualitative value (such as a document), or to retrieve such previously stored information. That is, when a user of a computer selects menu options "file," "save," and designates a "filename," the computer saves user data corresponding to the computer readable content (such as a document, spreadsheet, drawing, and the like) to a data storage device. It is noted that the computer system in handling file data also handles non-file object-oriented programming language structures such as inodes in accordance with embodiments of this invention. During a transfer the file data is accompanied by the non-file data, sometimes referred to as metadata, that provides system information for properly routing and processing the user data in order to reliably store and retrieve it. The metadata informs the data storage system of pertinent details such as what type of data format is being transferred, the file name, redundancy identifiers, and the like.

In these illustrative embodiments each of the remote clients 102 can view the entire physical storage capacity (via the drives 112) of the storage array 104 as a unified storage space. The storage array 104, the client 102, or a network appliance (not shown) virtualizes the physical storage space to a logical addressing nomenclature. The storage array 104 also buffers data being transferred between the clients 102 and the drives 112 to optimize I/O throughput performance, such as by employing writeback commands that temporarily store user data and acknowledge the write as being complete before that transfer of user data is actually completed via the drives 112. The storage array 104 can also advantageously employ predetermined fault tolerance arrangements in which parallel, redundant links store at least some of the user data so that a redundant copy of the user data can be retrieved or reconstructed in the event that the primary copy of the user data becomes unavailable.

The circuitries represented by the functional block depiction in FIG. 2 and otherwise throughout this description generally can be embodied in a single integrated circuit or can be distributed among a number of discrete circuits as desired. In these illustrative embodiments, a main processor 114, preferably characterized as a programmable computer processor, provides top-level control in accordance with programming steps and processing data stored in non-volatile memory (such as flash memory or similar) and in dynamic random access memory (DRAM). A memory, such as the cache 116, temporarily stores (buffers) unexecuted I/O commands and corresponding user data until such a time that they are executed to effect the transfer of the user data via the drives 112. Another control memory 118 is employed to store location information regarding where user data is stored elsewhere, and to provide for retrieving stored user data from multiple memories, as described herein. Examples of a control memory device 118 include, but are not limited to, solid state memory devices, magnetic disk drives, rotating memory devices, general random access memory devices, etc. Certain embodiments contemplate the control memory device 118 providing data recall (and data storage) at a significantly faster rate than that of bulk memory device 162, such as which uses tape cartridges 136 to retain data in the description below.

The controller 108 includes a fabric interface (I/F) 120 for communicating with the clients 102 via the fabric 106, and a drive I/F 122 for communicating with the drives 112. The I/F circuits 120, 122 and a path controller 124 form a pass-through communication path for commands and data between the drives 112 and the client(s) 102, such as by employing the cache memory 116. Again, although illustrated discretely, it will be understood that each path controller 124 and the corresponding I/F circuits 120, 122 can be unitarily constructed.

Figure 3:
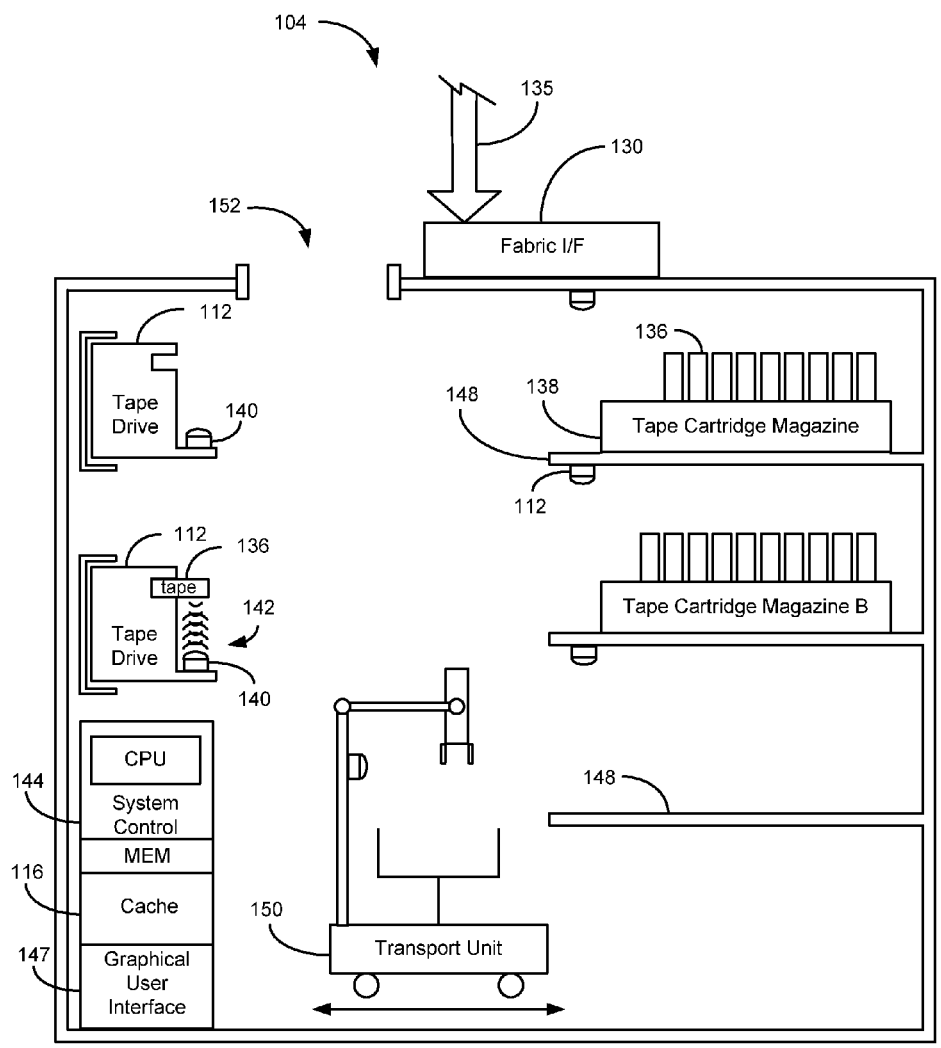
FIG. 3 is a diagrammatical depiction of the storage element array of FIG. 1 constructed in the form of a tape library in accordance with illustrative embodiments of the present invention.

FIG. 3 diagrammatically depicts the storage array 104 constructed as a tape library in accordance with illustrative embodiments of the present invention. External communications for the transfers of user data corresponding to the I/O commands are performed via the fabric interface 120 coupled to a communications link 135. The number and arrangement of the various components depicted in FIG. 3 are merely illustrative and in no way limiting of the claimed invention. The tape library has a plurality of tape cartridges 136 grouped in magazines 138. Each of the tape cartridges 136 is identifiable, such as by radio frequency identification (RFID) tags or semiconductor memory devices and the like, for selectively loading a desired one of the tape cartridges 136 into one of the plurality of tape drives 112. These illustrative embodiments depict the usage of a semiconductor memory in the form of a medium auxiliary memory ("MAM") device for this purpose. Again, these described embodiments in which the data storage device is a tape cartridge 136 selectively mounted in a tape drive 112 are merely illustrative and not limiting of the claimed embodiments. For example, without limitation, in equivalent alternative embodiments the drives 112 can be configured to transfer data with other types of removable data storage devices, and in other equivalent alternative embodiments the drives 112 can contain nonremovable data storage devices such as hard disc drives and solid state drives and the like.

In these illustrative embodiments, each of the tape cartridges 136 is selectively mounted into one of the tape drives 112 to cooperatively form an operable data transfer relationship to store data to and/or retrieve data from the tape cartridge 136. Each tape drive 112 can have a MAM device reader/writer 140 to store data to and/or retrieve data from the MAM device. In these illustrative embodiments the tape drive 112 establishes wireless communications 142 with the MAM device, such as by radio frequency communication, although neither the disclosed embodiments nor the claimed embodiments are so limited to those illustrative embodiments. The MAM device data can advantageously include access occurrence data, such as timestamp data indicating when the tape cartridge 136 is mounted to a tape drive 112, load count data indicating how long a tape cartridge 136 is mounted to the tape drive 112, validity data indicating any data and/or portions of the storage medium in a tape cartridge 136 of questionable integrity, and the like. Besides, or in addition to, storing data on the MAM devices, a system control 144 can include memory ("MEM") to accommodate information, such as the access occurrence data, load data, validity data, and the like, from each of a plurality of MAM devices associated with respective tape cartridges 136. Computational routines on the data stored in the MAM devices and in the system control memory can be under the top-level control of a central processing unit ("CPU"). A graphical user interface ("GUI") 147 provides helpful tabular and graphical information to a user of the tape library for providing inputs thereto and receiving useful outputs therefrom.

The tape library can advantageously have a shelving system 148 capable of processor-based archiving the magazines 138 within the tape library. The magazines 138, and hence the tape cartridges 136 the magazines 138 contain, remain in a queue functional state while stored in the shelving system 148. The term "queue functional state" for purposes of this description and meaning of the claims generally means a "wait functional state." A transport unit 150 shuttles magazines 138 between the shelving system 148 and the tape drives 112, and picks and places a particular tape cartridge 136 from a shuttled magazine 138 to/from a desired tape drive 112. The tape cartridges 136 are moved to a data transfer relationship functional state when mounted in the tape drives 112. Again, although FIG. 3 diagrammatically depicts two magazines 138 of eleven tape cartridges 136 each being shuttled to and from two tape drives 112, that arrangement is merely illustrative and in no way limiting of the claimed embodiments. In any event, a desired number of tape drives 112 can be provided within the tape library to concurrently access a corresponding number of tape cartridges 136 in a storage element array 104, or two or more tape libraries can communicate with each other to form that same or a similar storage element array 104.

The tape library is not necessarily limited to using a fixed number of tape cartridges 136. Rather, an access port 152 is configured to cooperate with an external transport system (not shown) to deliver or remove individual tape cartridges 136 or magazines 138.

Top-level control is provided by the CPU in communication with all the various components via a computer area network (not shown). Data, virtual mappings, executable computer instructions, operating systems, applications, and the like are stored to the system control memory and accessed by one or more processors in and/or under the control of the CPU. The CPU includes macroprocessors, microprocessors, memory, and the like to logically carry out software algorithms and instructions.

As one skilled in the art will recognize, the illustration of the tape library in FIG. 3 diagrammatically depicts only major elements of interest for purposes of simplicity. As such, certain necessary structures and components for the aforementioned elements to properly function are omitted from the detailed description, the enumeration of such not being necessary for the skilled artisan to readily ascertain the enablement of this description and the scope of the claimed subject matter. For example, it will be understood that the tape library includes all of the necessary wiring, user interfaces, plugs, modular components, entry and exit port(s) to introduce (or remove) removable storage elements, fault protectors, power supplies, processors, busses, robotic transport unit tracks, indication lights, and so on, in order to carry out the function of a tape library.

Figure 4:
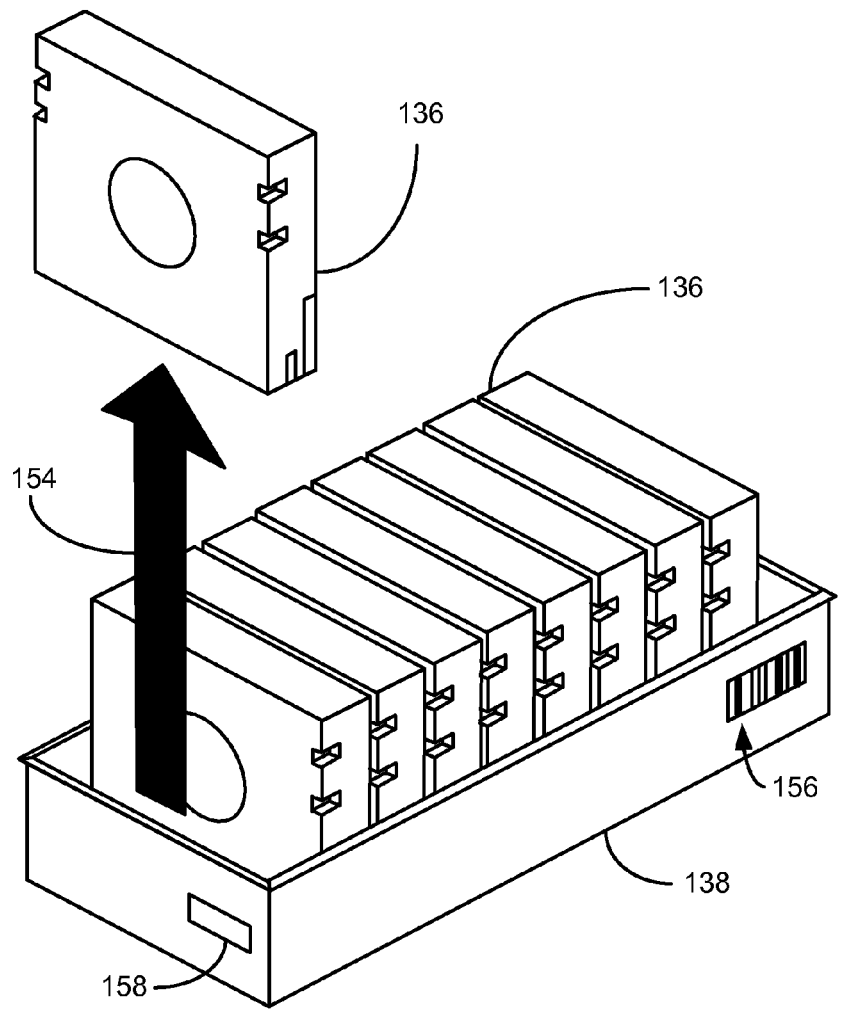
FIG. 4 is an isometric depiction of one of the magazines with tape cartridges in the tape library of FIG. 3.

FIG. 4 depicts the tape cartridges 136 supported for storage and transit by the magazine 138. In more detail, the tape cartridge 136, such as an LTO-5 or LTO-6 (generally "LTO") category tape cartridge manufactured by IBM, of Armonk, N.Y., employs magnetic tape that is capable of storing digital data written by the tape drive 112. The magazine 138 is depicted as being populated with a plurality of the tape cartridges 136, each of which can be removed upwardly by the transport unit 150 (FIG. 5), in the direction of arrow 154, then inserted into the tape drive 112. An indicia such as a bar code identification tag 156 is one way of identifying the magazine 138. Additionally, these embodiments depict a MAM device 158 attached to the magazine 138 and associated with one or more, preferably all, of the tape cartridges 136 residing in the magazine 138. Alternatively, the MAM device 158 can be attached to the tape cartridge 136. The MAM device 158 can be a passive device that is energized when subjected to a sufficiently strong radio frequency field generated by the MAM writer/reader device 140 (FIG. 3).

Figure 5:
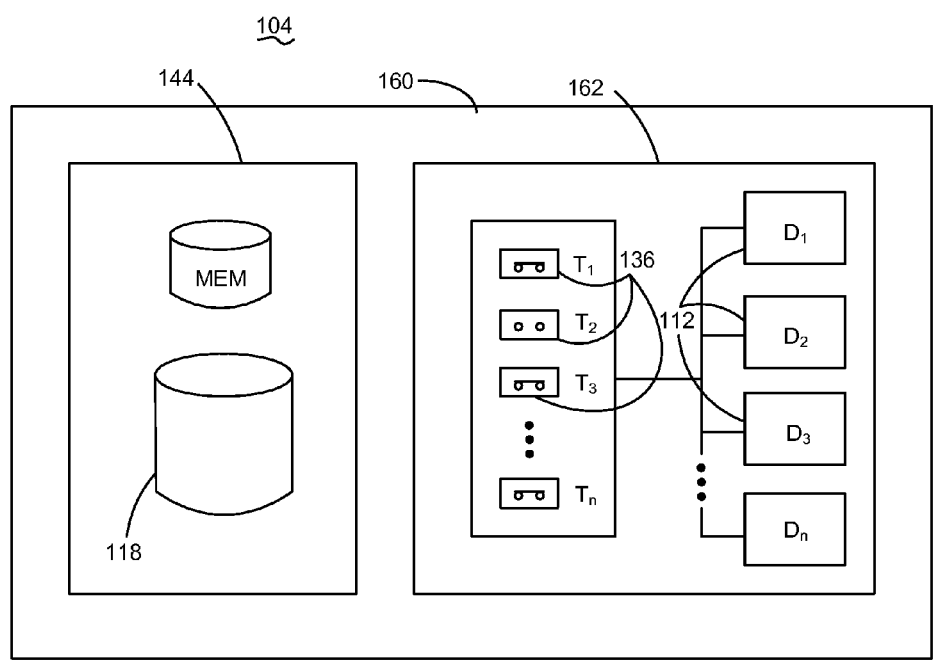
FIG. 5 is a functional block depiction of the storage space of the tape library of FIG. 3.

FIG. 5 diagrammatically depicts generally the storage array 104 of the present embodiments having an overall data storage space 160. A majority of the overall storage capacity resides in a bulk memory device 162 that in these illustrative embodiments is constructed collectively of the plurality of tape cartridges 136, tape drives 112, and the system control 144 (FIG. 3) that selectively mounts an individual tape cartridge 136 into one of the tape drives 112 in order to effect the transfer of user data to or from the mounted tape cartridge 136. These illustrative embodiments further depict the system control 144 including the control memory device 118 although the contemplated embodiments are not so limited.

Figure 6:
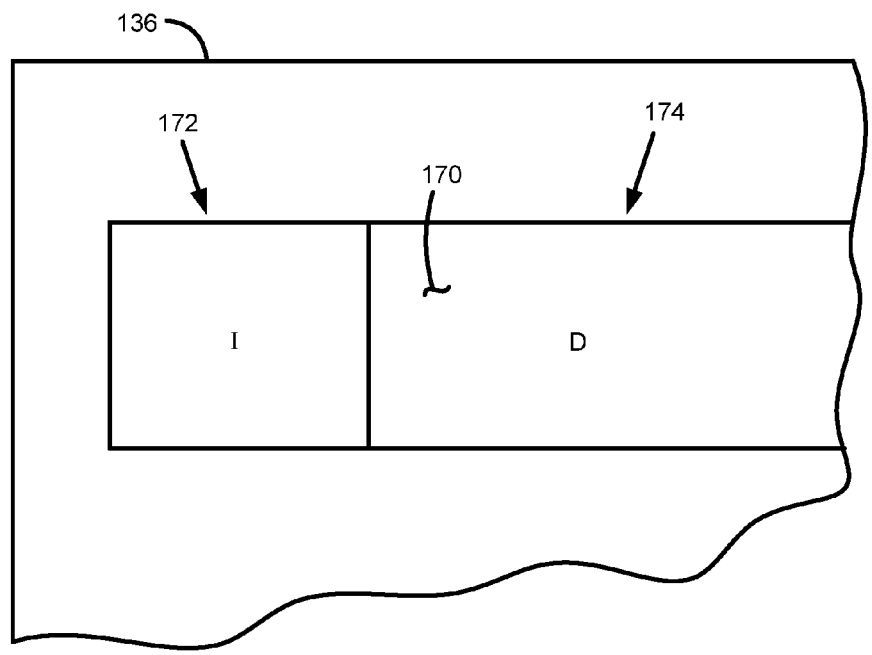
FIG. 6 diagrammatically depicts a portion of one of the tape cartridges in the tape library of FIG. 3.

FIG. 6 diagrammatically depicts the tape storage medium 170 in one of the tape cartridges 136 being partitioned into two completely separate data storage partitions 172, 174. The partitions 172, 174 depict a lateral partition, meaning a partition that spans entirely across all storage tracks of the tape medium 170. Alternatively, although not depicted, a longitudinal partition can be provided by designating one or more tracks to one partition and different tracks to the other partition or partitions. In any event, each partition 172, 174 is identified and addressed separately from the existence of any other data or other partition(s) on the tape storage medium 170. Again, although the illustrative embodiments depicted by FIG. 6 generally describe multi-partitioning in terms of two partitions 172, 174, this is by way of example; accordingly, the claimed embodiments are not so limited in that the skilled artisan will appreciate that in equivalent alternative embodiments the same can be said for three or more partitions. Also, importantly, although the illustrative embodiments depicted by FIG. 6 describe both partitions 172, 174 existing on the tape storage medium 170, the claimed embodiments are not so limited in that the skilled artisan appreciates that in alternative equivalent embodiments, one or all of the partitions, preferably the index partition discussed below, can be formed in the corresponding electronic indicia device (such as MAM 158 in FIG. 4) either on the tape cartridge 136 or on the magazine 138.

FIG. 6 more particularly depicts the tape storage medium 170 is formatted to include an index partition 172 and a user data partition 174. A corresponding label block (not shown) is typically written at the start of each respective partition 172, 174 to identify it as such. The index partition 172 contains an index "I" of any directories formatted to the user data partition 174 as well as any user data sets. For purposes of this description and meaning of the appended claims, "user data set" means a set of data collectively recognized and stored by the storage system, such as a computer-readable data file or an object-oriented programming language structure and the like, that is designated to the user data partition 174. Generally, I/O commands transfer user data between a client 102 and the storage array 104 in terms of a system recognizable (file or object) user data set. The term "designated to" can include both a user data set that is presently stored to the user partition 174 as well as a user data set that is directed to be stored to the user data partition 174 by way of a pending write command.

The index I in the index partition 172 is continually updated to reflect the addition and modification of user data sets in the user data partition 174. The addition or removal of user data can be the result of modifying or adding user data, or likewise can be the result of migrating user data without substantively changing it. It can be advantageous for data reliability sake to maintain a redundant copy of the index I, either in one of the partitions 172, 174 or in its own dedicated partition. For example, without limitation, the redundant index can be maintained at the old state pending and during the time that the primary index is rewritten, so that in the event of a data transfer error or interruption the data library can roll back to the previous state as defined by the redundant index to facilitate a quicker, more robust recovery from such an event in comparison to reconstructing the old state or remotely retrieving the old state information.

Figure 7:
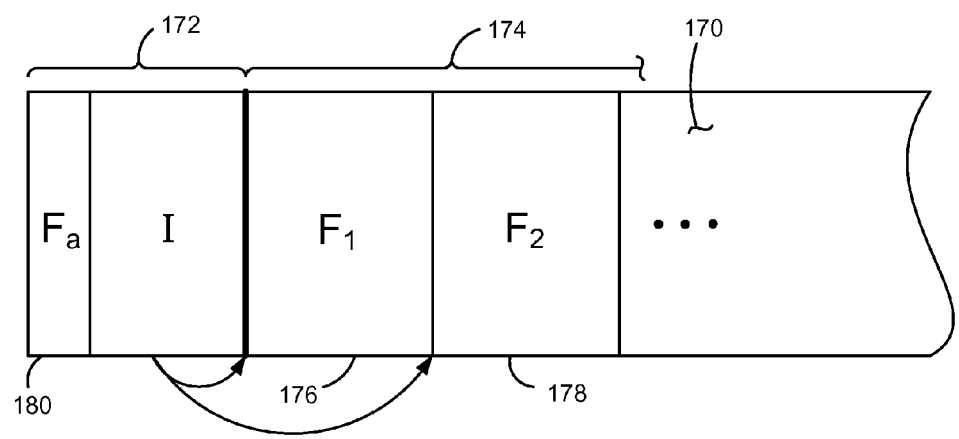
FIG. 7 is similar to FIG. 6 but depicting two user data sets in the user data partition and non-index data in the index partition.

FIG. 7 illustratively depicts an index I in the index partition 172 self-describing user data sets $F_1$ (176) and $F_2$ (178). The skilled artisan appreciates that although the user data sets $F_1$, $F_2$ are literally depicted as being sequentially stored in the user data partition 174, the user data sets $F_1$, $F_2$ can alternatively be physically stored non-sequentially. Furthermore, the index I is likely logically rearranged as the user data sets $F_1$, $F_2$ are updated, while some or all of the corresponding user data remains physically in the same location on the storage tape storage medium 170.

In these embodiments non-index data (metadata) $F_a$ (180) is also stored in the index partition 172. Although storing non-index data, such as $F_a$, on the index partition 172 might appreciably increase the time necessary to access the index I when the tape cartridge 136 is mounted to the tape drive 112, there are certain situations and certain types of non-index data $F_a$ for which doing so is advantageous. Preferably, any such non-index data $F_a$ are relatively small to minimize the loading delay associated with them, but small metadata files can advantageously contain information about much larger files stored elsewhere, such as on the corresponding user data partition(s) in accordance with embodiments of the present invention.

Non-index data $F_a$ like this can support data applications to find and/or manipulate specific content within large user data sets without the need to read the large user data set in its entirety. The operations conducted by these non-index data $F_a$ in the index partition 172 can effectively be exploited by continually writing and deleting them as flag data instead of continually adding new non-index data $F_a$, to keep their size and imposition to a minimum with regard to the underlying purpose of the index I in the index partition 172. Furthermore, the handling of the non-index data $F_a$ in the index partition 172 and the library functions which the non-index data $F_a$ initiates, can be performed independently of, and without any adverse effect whatsoever on, the user data sets $F_1$, $F_2$ designated to the user data partition 174.

Although the illustrative embodiments of FIG. 7 depict only one such non-index data $F_a$, the claimed embodiments are not so limited in that the skilled artisan appreciates that the same can be said for a plurality of such non-index data $F_a \ldots F_x$ without the need for further elaboration. In any event, when the tape cartridge 136 is mounted to one of the tape drives 112 (at tape mount time) the index I and the non-index data $F_a$ stored on the index partition 172 are first and quickly read.

An important advantage of the present embodiments is a rapid and self-describing response following access to information gained from non-index data $F_a$ stored in the index partition 172. The self-describing response can spring from the execution of computer instructions stored in the system control 144. Particularly, in these embodiments self-describing logic is advantageously triggered, whether the result of storing data to or retrieving data from the tape cartridge 136, to create a dual record of a selected user data set $F_1, F_2, \ldots F_n$. The dual records can reside in the control memory device 118 and in the tape cartridge 136. Existence of the dual record advantageously creates options for the system control 144 during a subsequent retrieval of the user data set $F_1, F_2 \ldots F_n$. For example, without limitation, it can be advantageous to immediately begin retrieving a first amount of the user data set $F_1, F_2 \ldots F_n$ from a solid state drive or similar digital storage device employed as the control memory device 118, during the time required to mount the tape cartridge 136 in the tape library employed as the bulk memory device 162, where a different amount of the user data set $F_1, F_2 \ldots F_n$ is stored. Thus, two data streams can be interleaved to the same memory to effectively marry the quick response of solid state storage with the economy and reliability of tape storage in retrieving the entire user data set $F_1, F_2 \ldots F_n$.

To meet that need for a dual record, the non-index data $F_a$ can invoke either a copy or a migration operation for a predetermined amount of the accessed user data set $F_1, F_2 \ldots F_n$. By "accessed" it is meant that the dual record function can be invoked either when the user data set $F_1, F_2 \ldots F_n$ is stored to or retrieved from the tape cartridge 136. Preferably, the dual record operation is queued in the system to run as a background operation so as to not adversely affect the data throughput performance of the tape library in meeting the I/O command load. Thus, a first amount of the user data set $F_1, F_2 \ldots F_n$ resides in the control memory device 118 and a second amount of the user data set $F_1, F_2 \ldots F_n$ resides in the tape cartridge 136. In some illustrative embodiments the first amount and the second amount together define the entirety of the user data set $F_1, F_2 \ldots F_n$. In equivalent alternative embodiments the second amount is the entire user data set and the first amount is a copy of a portion of the second amount.

Figure 8:
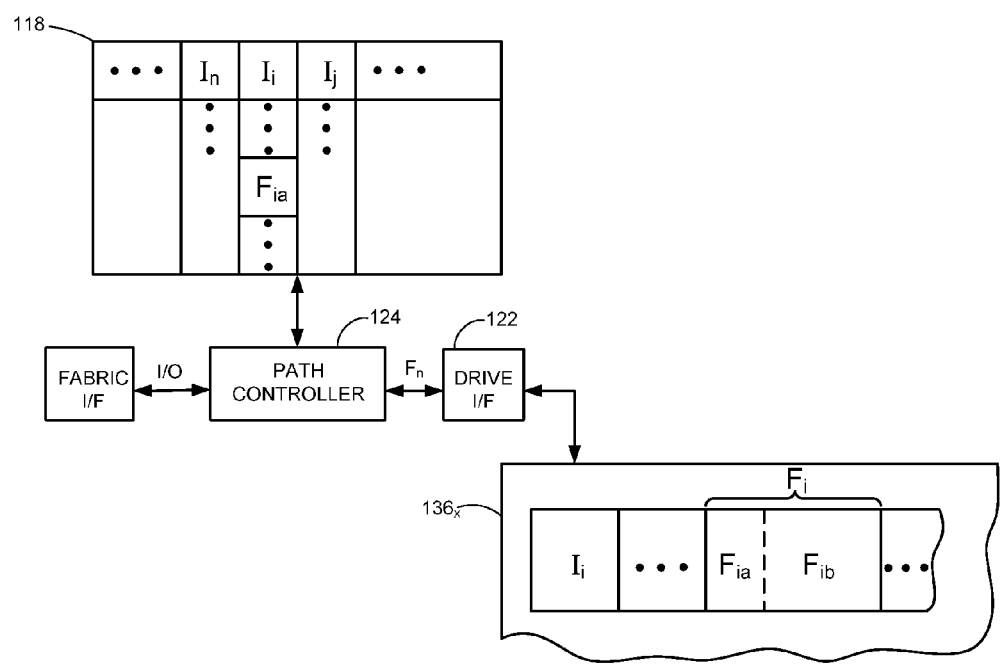
FIG. 8 diagrammatically depicts the path controller interleaving a first amount of the user data set from the control memory with a different second amount of the user data set from the tape cartridge in executing an I/O command to transfer the user data set to the client via the fabric I/F.

FIG. 8 diagrammatically depicts the latter illustrative embodiments in which the tape library, in response to an I/O command to store one of the user data sets $F_i$ to tape cartridge $136_i$, copies the updated index information and a predetermined amount $F_{ia}$ of the user data set $F_n$ to the control memory device 118. After completion of the self-describing copy operation the control memory device 118 stores location information for the user data set $F_i$ in $I_i$. That is, in response to a subsequent I/O command to access user data set $F_i$ the system control 144 can index the control memory device 118 to obtain an updated index $I_i$ ascertaining the address at which the user data set $F_i$ is stored in tape cartridge $136_x$. Advantageously, the control memory device 118 also makes available to the system control 144 some or all of the predetermined amount $F_{ia}$ of the user data set $F_i$. The path controller 124 can therefore satisfy an I/O command to retrieve user data set $F_i$ by selectively interleaving any or all of the first amount $F_{ia}$ from the control memory device 118 and any or all of a different second amount $F_{ib}$ from the tape library.

Figure 9:
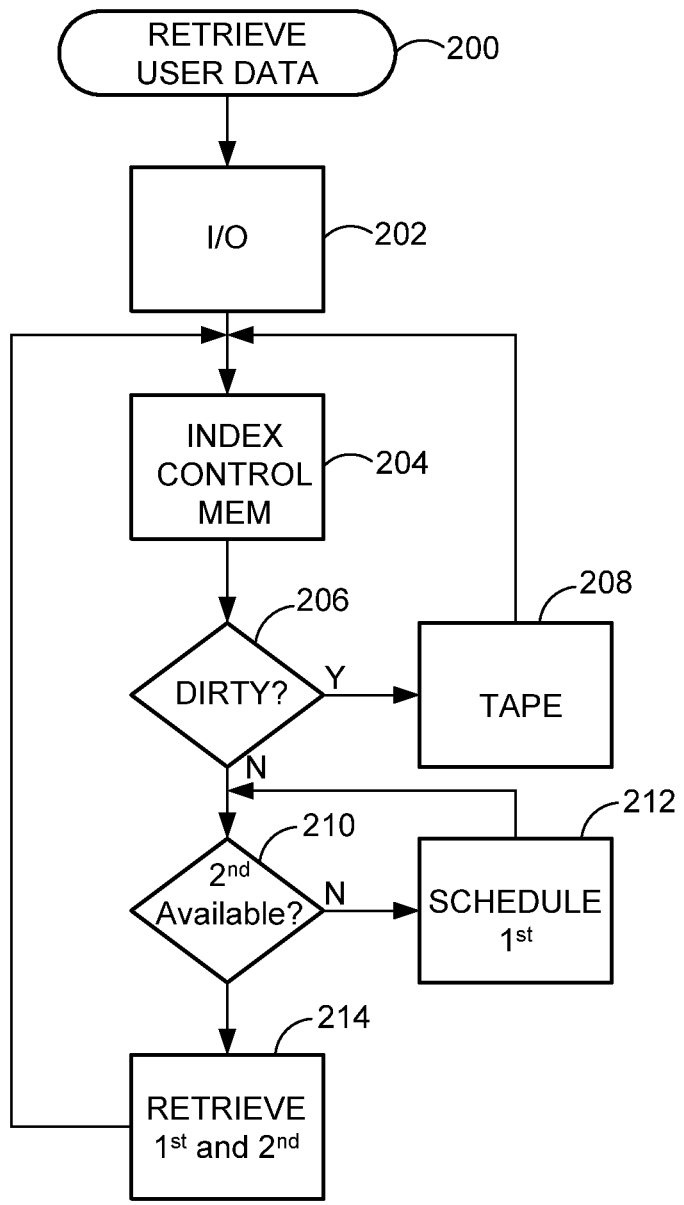
FIG. 9 is a flowchart depicting steps for a RETRIEVE USER DATA method in accordance with embodiments of the present invention.

FIG. 9 is a flowchart of steps described by computer instructions that when executed implement a method 200 to RETRIEVE USER DATA in accordance with illustrative embodiments of the present invention. The method 200 begins in block 202 in response to the stream of I/O commands between the client and the data storage array described herein. In executing an I/O command for a particular user data set the path controller first indexes the control memory device in block 204 to obtain file attribute data for the user data set of interest. The file attributes provided by the control memory device can be anything useful to managing the user data system-wide, but at a minimum the file attributes provide user data location information such as a physical address of the user data set in the tape library. Other useful file attributes can include things such as the file name, file size, file type, date of creation, date of last modification and other dates, access permission information, checksum of the file content, owner, and the like. The non-index data might otherwise include information such as a mode number, a sequential number where concatenation is used to combine files, or a file ID. The non-index data might otherwise contain an encryption key used to encrypt or decrypt the file data.

A particularly useful file attribute is a flag indicating whether the smaller portion of the user data set that is also stored in the control memory device is dirty. That determination is made in block 206. Recall from above that the user data copy or migration operation creating the dual record of a portion of user data stored to a tape cartridge can advantageously be time-shifted to run in the background so as to minimize the data throughput performance of the storage array in executing the I/O command load. If the determination of block 206 is that the user data set in the tape cartridge is updated but the portion in the control memory is pending a corresponding update, meaning the portion of the user data set in the control memory is dirty, then the path controller retrieves the entire user data set from the tape cartridge(s) in block 208 and processing returns to block 204.

If, however, on the other hand the determination of block 206 is "no," then in block 210 the path controller is informed as to when, in terms of overall system rules and policy, the tape cartridge(s) storing the bulk of the selected user data set can be mounted in a drive. Based on that availability, in block 212 the path controller schedules execution of the I/O command in order to retrieve the portion of the user data set from the control memory at an advantageous time in relation to when the bulk of the user data set can be retrieved from the tape cartridge(s). For example, in block 214 the controller can, if so desired, execute computer instructions that waits to retrieve the portion of the user data from the control memory until the bulk of the user data is available from the tape cartridge(s) so that the controller can retrieve both the portion and the bulk simultaneously, or nearly so. That makes it possible to interleave the portion and the bulk as a sequential stream. Alternatively, in block 214 the controller can schedule retrieving the portion from the control memory before the bulk of the user data set is available, and either cache it or transfer it to the client separately from the bulk of the user data set. In that event process control can pass from the controller to the control memory to access the portion of the user data set from the control memory and then, in turn, the control memory accesses the bulk of the user data set from the tape library. The latter system control arrangement can be particularly advantageous where the portion of the user data set stored in the control memory is a higher priority subset of the user data that can be used to facilitate some operation using the user data set.

Figure 10:
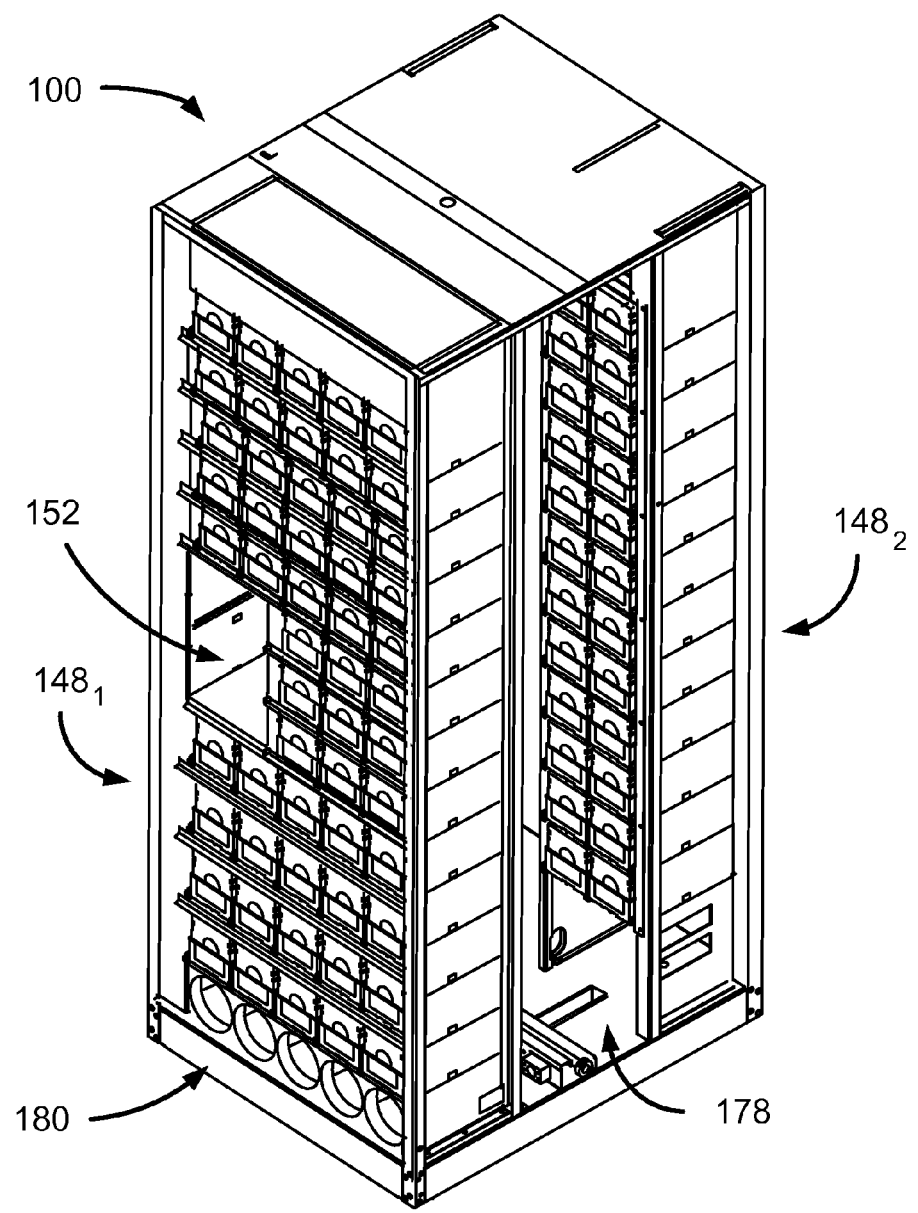
FIG. 10 is an isometric depiction of a portion of a tape library constructed in accordance with illustrative embodiments of the present invention.

Embodiments of the present invention can be commercially practiced in a Spectra Logic T-950 tape cartridge library manufactured by Spectra Logic of Boulder Colo. FIG. 10 shows a commercial embodiment of one T-950 tape library without an enclosure. The T-950 tape library comprises a first and second shelf system $148_1$, $148_2$ that are adapted to support a plurality of the mobile media, such as the magazine 138 holding a plurality of LTO tape cartridges 136 with MAMs, archived by the tape library. The shelf systems $148_1$, $148_2$ can each have at least one auxiliary memory reader. Disposed next to the second shelf system $148_2$ are at least four IBM LTO tape drives 112 adapted to write data to and read data from a tape cartridge 136. The IBM LTO tape drives 112 each have the capability of storing data to an auxiliary radio frequency memory device contained in an LTO-3 tape cartridge 136. Functionally interposed between the first and second shelf system $148_1$, $148_2$ is a magazine transport space 178. The magazine transport space 178 is adapted to provide adequate space for a magazine 138 to be moved, via the transport unit 150 (FIG. 3), from a position in the first shelf system $148_1$, for example, to a tape drive 112. The transport unit 150 can further accommodate at least one auxiliary radio frequency memory device reader. Magazines 138 can be transferred into and out from the T-950 tape library via the entry/exit port 152. Transferring magazines 138 in and out of the T-950 tape library can be accomplished by an operator, for example. The T-950 tape library comprises a means for cooling as shown by the fans 180, located at the base of the tape library. The T-950 tape library can be linked to a central data base, providing control in storage of all of the auxiliary radio frequency memory devices contained in each tape cartridge 136 in the T-950 tape library as read by any one of the auxiliary radio frequency memory device readers. The T-950 tape library also includes the library CPU 146 (FIG. 3) providing top-level control and coordination of all processes. The T-950 tape library also provides the graphical user interface 147 (FIG. 3) whereon a display of assessment results or, in alternative embodiments, simple messages can be displayed pertaining to a user-specified action associated with a tape cartridge 136 such as an alert accompanying a sound alarm or recommendations for further action/s, for example.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, multiple or even predetermined pluralities of tape drives can be managed in the user data retrieval process for example, while still maintaining substantially the same functionality without departing from the scope and spirit of the claimed invention. Another example can include using these techniques across multiple library partitions, while still maintaining substantially the same functionality without departing from the scope and spirit of the claimed invention. Further, though communication is described herein as between a client and the tape library communication can be received directly by a tape drive, via the interface device 120, for example, without departing from the scope and spirit of the claimed invention. Further, for purposes of illustration, a first and second tape drive and tape cartridges are used herein to simplify the description for a plurality of drives and tape cartridges. Finally, although the preferred embodiments described herein are directed to tape drive systems, and related technology, it will be appreciated by those skilled in the art that the claimed invention can be applied to other systems, without departing from the spirit and scope of the present invention.

It will be clear that the claimed invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the claimed invention disclosed and as defined in the appended claims.

It is to be understood that even though numerous characteristics and advantages of various aspects have been set forth in the foregoing description, together with details of the structure and function, this disclosure is illustrative only, and changes may be made in detail, especially in matters of structure and arrangement to the full extent indicated by the broad general meaning of the terms in which the appended claims are expressed.

What is claimed is:

1. A data storage system comprising:
a data storage space operably transferring data via input/output (I/O) commands between the data storage system and another device, the data storage space comprising:
a first memory device of the storage space operably storing location information for executing the I/O commands; and
a second memory device of the storage space different than the first memory device, the second memory device formatted to include an index partition and a data partition; and
a controller that is configured, in response to executing an I/O command to write at least a portion of a user data set to the second memory device, to update the location information by copying the index partition to the first memory device, to copy a portion of the user data set to the first memory device, and to subsequently interleave the user data from the first memory device with the user data from the second memory device during execution of another of the I/O commands.

2. The data storage system of claim 1 wherein the user data stored to the second memory device is an entirety of the user data set.

3. The data storage system of claim 1 wherein the controller is configured to access the user data via the first memory device at a time determined by an availability of the user data via the second memory device.

4. The data storage system of claim 1 wherein the controller is configured to access the user data via the first memory device which, in turn, accesses the user data via the second memory device.

5. The data storage system of claim 1 wherein the controller is configured to index the first memory device for the user data via the second memory device.

6. The data storage system of claim 1 wherein the first memory device is a first type of data storage device and the second memory device is a second type of data storage device that is different than the first type of data storage device.

7. The data storage system of claim 1 wherein the second memory device includes one or more tape cartridge data storage devices.

8. The data storage system of claim 1 wherein the first memory device includes one or more solid state data storage devices.

9. The data storage system of claim 1 wherein the controller is configured to execute stored computer instructions that write the portion of the user data set to the first memory device.

10. The data storage system of claim 1 wherein the controller is configured to execute stored computer instructions that update the location information in the first memory.

11. The data storage system of claim 1 wherein the location information is a system attribute.

12. The data storage system of claim 11 wherein the system attribute is selected from the group consisting of object-oriented storage structure, directory name, hierarchy, file name, file size, file type, and encryption information.

13. A method comprising:
operating a data storage system containing a data storage space including a first memory device and a second memory device different than the first memory device, the second memory device partitioned to include an index partition and a data partition;
in response to executing a write input/output (I/O) command to transfer at least a portion of a user data set to the second memory device, copying the index partition to the first memory device to update location information for the user data set, and copying a portion of the user data set to the first memory device; and
in response to a second I/O command, interleaving the user data from the first memory device with the user data from the second memory device.

14. The method of claim 13 wherein the interleaving is characterized by accessing the user data via the first memory device at a time determined by an availability of accessing the user data via the second memory device.

15. The method of claim 13 wherein the interleaving is characterized by accessing the user data via the first memory device which, in turn, accesses the user data via the second memory device.

16. The method of claim 13 wherein the interleaving is characterized by indexing the first memory device for the user data via the second memory device.

17. The method of claim 13 wherein the executing a write I/O command is characterized by mounting one or more tape cartridge data storage devices.

18. A data storage library comprising:
a frame;
a shelf system supported by the frame and configured to queue a plurality of magazines;
a plurality of tape cartridges each removably supported by one of the plurality of magazines, each tape cartridge formatted to include an index partition and a data partition;
a plurality of drives each configured to engage one of the tape cartridges at a time in a data transfer relationship;
a transport system configured to selectively move the tape cartridges between the queue in the shelf and the data transfer relationships in one of the plurality of drives;
a data storage space configured to transfer data via input/output (I/O) commands between the data storage library and another device, the data storage space including a first memory device configured to store location information for executing the I/O commands with a selected tape cartridge of the plurality of tape cartridges; and
a controller that is configured, in response to an I/O command to write at least a portion of a user data set to the selected tape cartridge, to update the index partition of the selected tape cartridge to reflect the user data set, to copy the index partition to the first memory device to update the location information, to copy a portion of the user data set to the first memory device, and to subsequently interleave the user data from the first memory device with the user data from the selected tape cartridge in response to another I/O command.

* * * * *